United States Patent
Huang

(10) Patent No.: US 7,193,511 B2
(45) Date of Patent: Mar. 20, 2007

(54) RAPID-MOUNTING SECURITY MONITORING AND CONTROLLING SYSTEM

(75) Inventor: Chun-Ju Huang, Taipei (TW)

(73) Assignee: AV Tech Corporation, Hsichih (TW)

( * ) Notice: Subject to any disclaimer, the term of this patent is extended or adjusted under 35 U.S.C. 154(b) by 167 days.

(21) Appl. No.: 10/856,821

(22) Filed: Jun. 1, 2004

(65) Prior Publication Data

US 2005/0275526 A1 Dec. 15, 2005

(51) Int. Cl.
*G08B 29/00* (2006.01)
(52) U.S. Cl. ............... 340/506; 340/531; 340/533; 340/7.29; 340/870.18; 348/143
(58) Field of Classification Search ........... 340/506, 340/531, 533, 541, 546, 564, 7.29, 539.1, 340/870.18; 348/143, 153, 159
See application file for complete search history.

(56) References Cited

U.S. PATENT DOCUMENTS

| 4,511,886 | A | * | 4/1985 | Rodriguez | ............... 340/534 |
| 5,745,167 | A | * | 4/1998 | Kageyu et al. | ............. 348/153 |
| 6,025,874 | A | * | 2/2000 | Cooper et al. | ............. 348/159 |
| 6,709,172 | B2 | * | 3/2004 | Brown | ..................... 396/427 |
| 6,930,598 | B2 | * | 8/2005 | Weiss | ...................... 340/531 |

* cited by examiner

*Primary Examiner*—Davetta W. Goins
(74) *Attorney, Agent, or Firm*—Leong C. Lei

(57) ABSTRACT

A rapid-mounting security monitoring and controlling system is disclosed. Co-axial cable is used to transmit power supply, images, sound, and to control detected signals so as to rapidly installation of wirings for the security monitoring and controlling system. The complexity of wiring installation is improved and the installation cost and the material cost are greatly reduced.

1 Claim, 3 Drawing Sheets

RAPID-MOUNTING SECURITY MONITORING AND CONTROLLING SYSTEM

BACKGROUND OF THE INVENTION (a) Technical Field of the Invention

The present invention relates to rapid-mounting security monitoring and controlling system, and in particular, to a security monitoring and controlling system employing a single co-axial cable to in achieving transmission of power supply, images, sound, and controlling detection signal so as to improve the complexity of mounting procedures.

(b) Description of the Prior Art

FIG. 1 schematically shows a conventional security monitoring and controlling system device. For a single controller, in the course of wiring there are power supply cable, image transmission cable, sound transmission cable, control signal transmission cable, detection cable, etc., to respectively provide power supply and signal transmission. In simple words, too many cables without integration complicate wiring implementation and increase the cost of wiring material. The drawback of such system is that the installation of the controllers and scope of application of the system are greatly restricted. This will not allow multiple monitoring and controlling at the far end.

Today, in this era of advanced technology, the security monitoring and controlling system is of great importance to the contemporary communities such as in financial institutions, companies, offices, etc, and in modern houses. This system has been employed and the security monitoring and controlling system is now greatly enhanced with respect to linear-controlled image, sound, recording and controlling signal transmission. As a result, the wiring system of the conventional security monitoring and controlling system becomes very complicated and the cost of installation of the security system increases. Accordingly, it is an object of the present invention to provide a rapid-mounting security monitoring and controlling system, which mitigates the above drawbacks.

SUMMARY OF THE INVENTION

Accordingly, it is an object of the present invention to provide a rapid-mounting security monitoring and controlling system employing co-axial cable connected to a far end monitoring and controlling system, wherein the far end security monitoring and controlling system includes one or a plurality of video cameras for far end security monitoring and controlling system; one or a plurality of digital recorder and players for far end security monitoring and controlling system; one or a plurality of controllers for far end security monitoring and controlling system; one or a plurality of monitors for monitoring image application by monitoring officer; and the co-axial cable is employed to link each of the above components of the far end security monitoring and controlling system, and the co-axial cable is used to transmit power supply, images, sound, control and detect signal, etc. and the system can transmit controlling by means of internet devices or telecommunication transmission to achieve internet monitoring and controlling.

Still another object of the present invention is to provide a rapid-mounting security and monitoring system, wherein the signal emitting end of the far end security monitoring and controlling system modulates signals and the modulated signals are transmitted to the receiving end of the far end security system via the co-axial cable, and the signal receiving end demodulates the signals and are then transmitted to individual processing units include the control unit, image-recording unit, sound-recording unit or the power supply unit.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
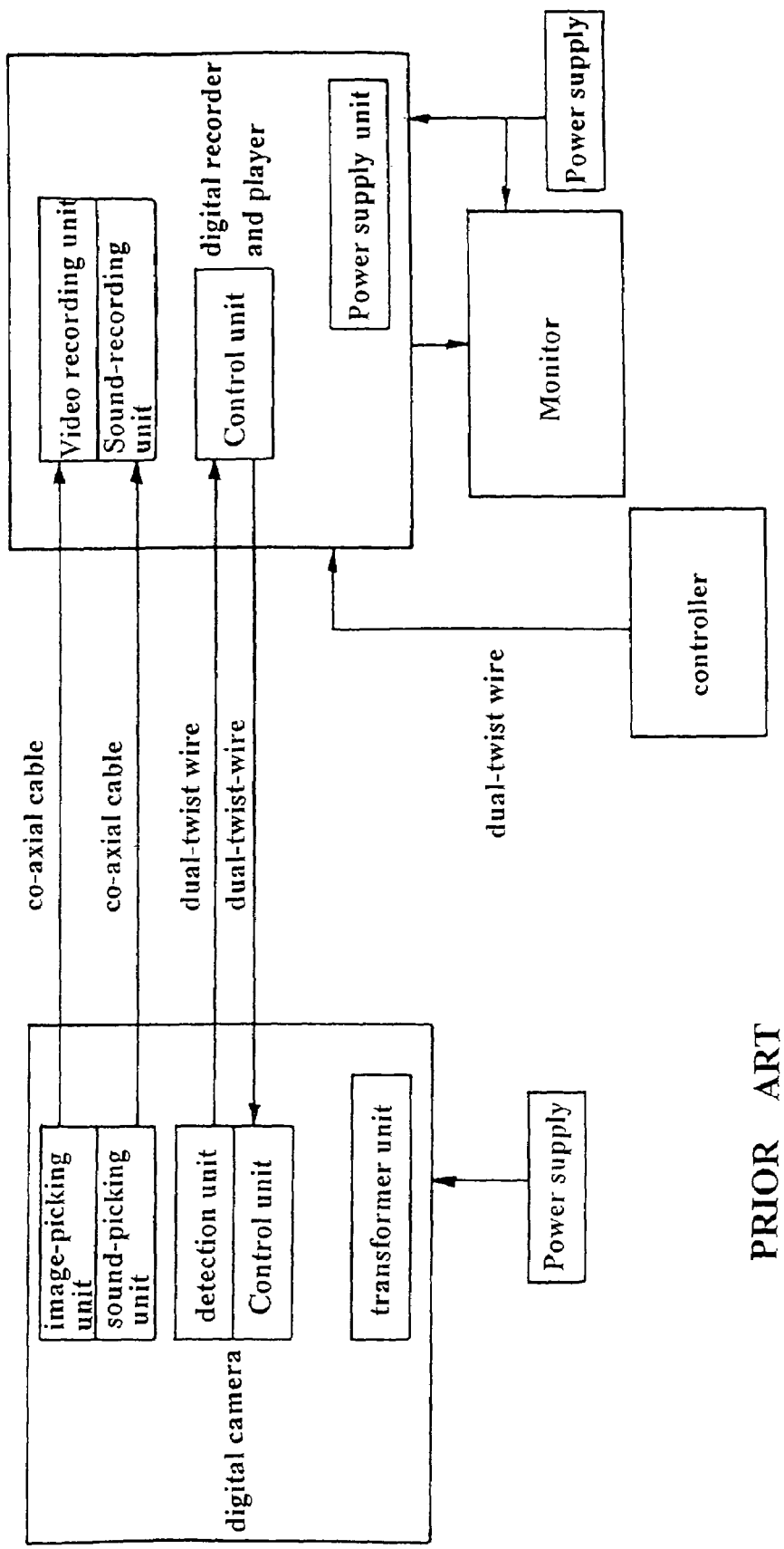
FIG. 1 is a schematic view of a conventional security monitoring and controlling system.
Figure 2:
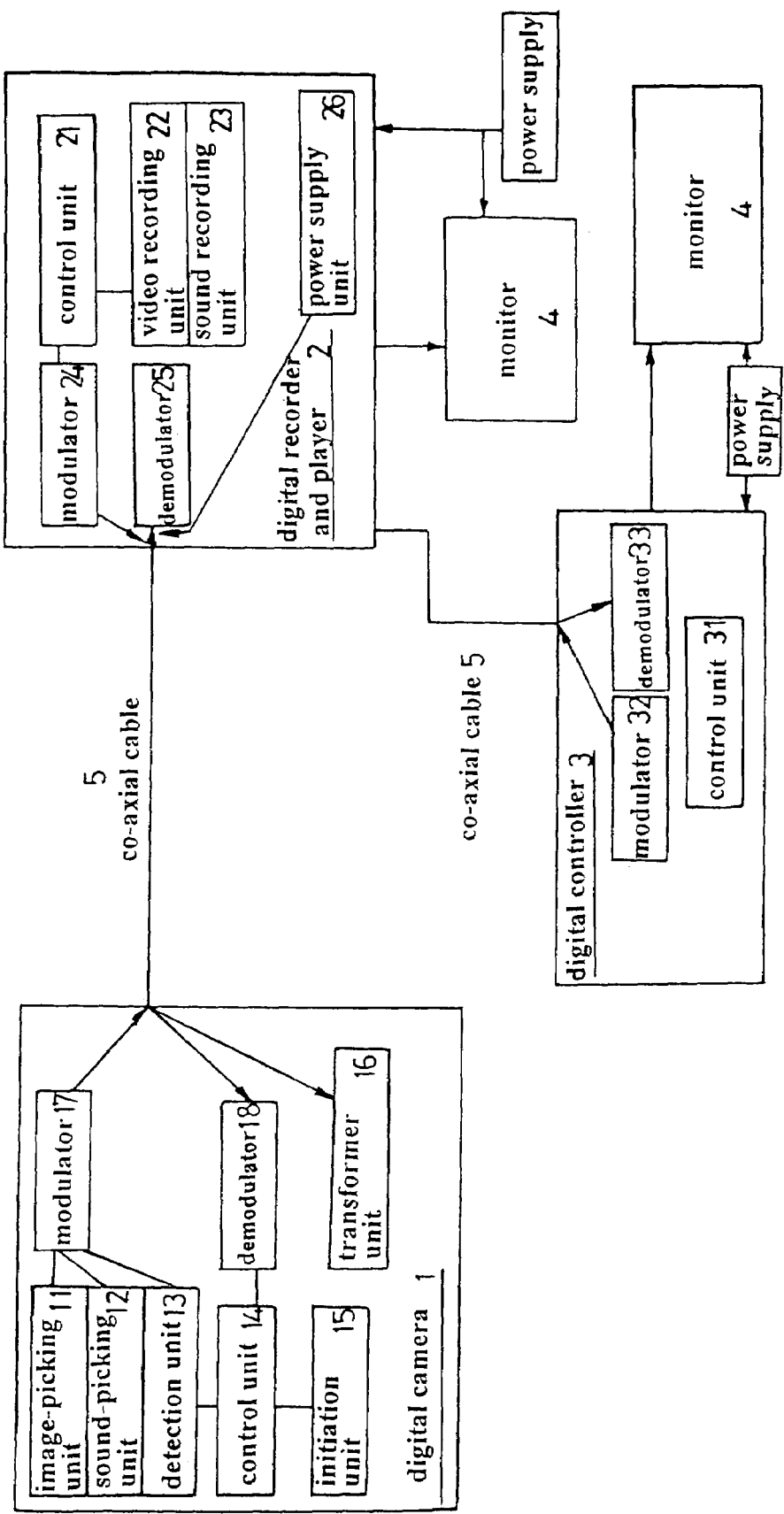
FIG. 2 is a schematic view of a security monitoring and controlling system in accordance with the present invention.

Referring to FIG. 2, the far end security monitoring and controlling system comprises one or a plurality of video cameras 1, one or a plurality of digital recorders and players 2, one or a plurality of digital controllers 3, one or a plurality of monitors 4. Between two of the individual components of the far end security and monitoring system, a co-axial cable 5 is used for connection these components so as to transmit power supply, images, sound control, and to detect signal.

The camera 1 includes an image-picking unit 11, a sound-picking unit 12, a detection unit 13, a control unit 14, an initiation unit 15, a transformer unit 16, a modulator 17 and a demodulator 18. The image-picking unit 11 employs CCD (COMS) photo sensor unit to obtain images, which are then processed by a digital signal processor and the processed images are send out as signal.

The sound-picking unit 12 employs a microphone to pick-up sound signal, which is then amplified for transmission.

The detection unit 13 includes at least a contact switch, far infra-red sensor, mask interruption sensor or the combination thereof. When a status is detected a signal is then transmitted.

The control unit 14 can be a microprocessor, which can control the parameter of the individual units and decide the initiation of the video camera based on the received commands and the detected status.

The initiation unit 15 includes a motor driver and gears, which execute up, down, left, right movement and zooming and focusing based on the commands of the control unit 14.

The transformer unit 16 includes AC power supply and transformer element which convert the power on the co-axial cable into the required power supply such as DC 12V, 5V, 3V, etc for the individual units.

The modulator 17 can modulate signals of the image-picking unit 11, the sound-picking unit 12 and the detection unit with different specific frequency and then transmit the signal to the co-axial cable 5.

The demodulator 18 demodulates the specific frequency signal on the co-axial cable 5 and then demodulates the signal, and the signal is then transmitted to the control unit 14.

One or a plurality of digital recorders and players 2 include a control unit 21, image recording unit 22, a sound-recording unit 23, a modulator 24, a demodulator 25 and a power supply unit 26, wherein the control unit 21 includes a microprocessor, which can generate commands to control the parameters for the individual units to decide initiation method and control far end video cameras based on the status received from the external controller, and the detected status.

The recorder unit 22 receives images and control unit commands to proceed with recording of images to the storage device or play the images to the monitor.

The sound recording unit 23 receives sound and control command to proceed sound recording and image recording to the storage device or play sound to the speaker.

The modulator 24 modulates signals of the control unit 11 with different frequencies and modulated signals are transmitted to the co-axial cable 5.

The demodulator 25 demodulates the specific frequency signal on the co-axial cable 5 and the demodulated signals are then transmitted to the control unit 21, the recording unit 22 and the sound-recording unit 23.

The power supply unit 26 transfers external power supply to the individual internal units and the co-axial cable.

One or a plurality of digital controller 3 includes a control unit 31, a modulator 32, and a demodulator 33, wherein the control unit 31 is a microprocessor. Based on the received status of the press button and the detection status, a command is generated to control far end video camera and the digital recorder and player.

The modulator 32 which modulate signals of the control unit 11 with different specific frequency, and the modulated signals are then transmitted to the co-axial cable 5.

The demodulator 33 which demodulates the specific frequency on the co-axial cable and the demodulated signals are then transmitted to the control unit 31 and the monitor.

The signal emitting ends of the above components depends on the signals after modulated by the modulators 17, 24, 32, and the co-axial cable 5 transmits the signals to the receiving ends of the demodulators 18, 25, 33 for demodulation. The signals are then transmitted to the individual processors for processing, that is a single co-axial cable 5 is used for transmission in far end security monitoring and controlling system. If the power supply should be DC 50V or below AC 50V, the voltage from the near end device is supplied to the far end device, and is transformed and stabilized, and is then supplied to the far end device.

Figure 3:
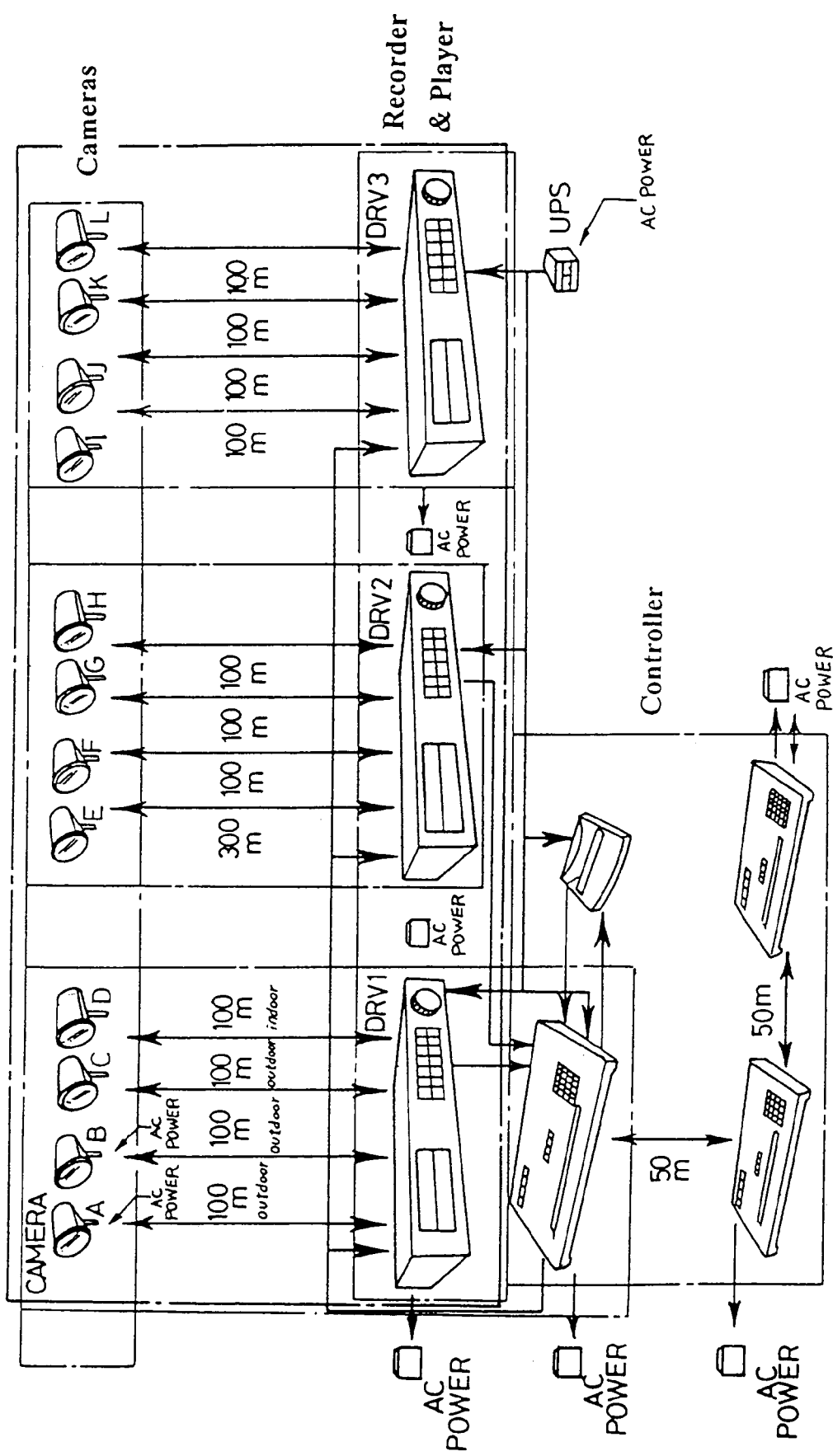
FIG. 3 is a schematic view showing a preferred embodiment of the security monitoring and controlling system in accordance with the present invention.

As shown in FIG. 3, the wiring capacity is reduced and the wiring system is extended so as to complete regional security monitoring and controlling system.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A rapid mounting security monitoring and controlling system comprising:
    one or a plurality of digital controllers;
    one or a plurality of monitors;
    a co-axial cable connecting said video cameras, digital recorders and players, said digital controllers and monitors for transmitting power, images, sound control and to detect signal;
    one or a plurality of digital recorders and players for far end security monitoring and controlling system;
    one or a plurality of controllers for far end security monitoring and controlling system;
    one or a plurality of monitors for monitoring of images application by monitoring officer; and said co-axial cable being employed to link each of components of a far end security monitoring and controlling system, and said co-axial cable being used to transmit power supply, images, sound, control and to detect signal, and said system transmitting controlling by means of internet devices or telecommunication transmission to achieve internet monitoring and controlling; and
    wherein signal emitting end of a far end security monitoring and controlling system modulates signals and the modulated signal is transmitted to a signal receiving end via said co-axial cable, and said signal receiving end demodulates signal which is then transmitted to processing units which include control unit, image-recording unit, sound-recording unit or power supply unit.

* * * * *